(12) United States Patent  
Sato

(10) Patent No.: US 6,704,040 B2  
(45) Date of Patent: Mar. 9, 2004

(54) CELLULAR PHONE SET AND REMOTE CONTROL METHOD USED THEREFOR

(75) Inventor: Ryohei Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 207 days.

(21) Appl. No.: 09/921,888

(22) Filed: Aug. 6, 2001

(65) Prior Publication Data

US 2002/0021352 A1 Feb. 21, 2002

(30) Foreign Application Priority Data

Aug. 9, 2000 (JP) ........................................ 2000-240548

(51) Int. Cl.[7] .................................................. H04N 7/14
(52) U.S. Cl. .............................. 348/14.02; 379/102.01; 379/93.12
(58) Field of Search ........................... 348/14.01–14.09, 348/14.1, 14.11, 14.13, 211.2, 211.6; 455/556; 379/37, 43, 102.01, 93.02; H04N 7/14

(56) References Cited

U.S. PATENT DOCUMENTS 6,323,892 B1 * 11/2001 Mihara .................... 348/14.01  
6,529,230 B1 * 3/2003 Chong .................... 348/14.01

FOREIGN PATENT DOCUMENTS

EP 0930770 A2 * 7/1999 ............ H04N/1/00  
JP 403092053 A * 4/1991 ............ H04M/1/00

* cited by examiner

*Primary Examiner*—Melur Ramakrishnaiah  
(74) *Attorney, Agent, or Firm*—Foley & Lardner

(57) ABSTRACT

A cellular phone set includes the videophone function of performing real-time image transfer by using a communication scheme with high transmission capability, and a section for transmitting control data for controlling various functions including the videophone function on a distant side in response to a specific external operation during speech communication. A remote control method for a cellular phone set is also disclosed.

2 Claims, 3 Drawing Sheets

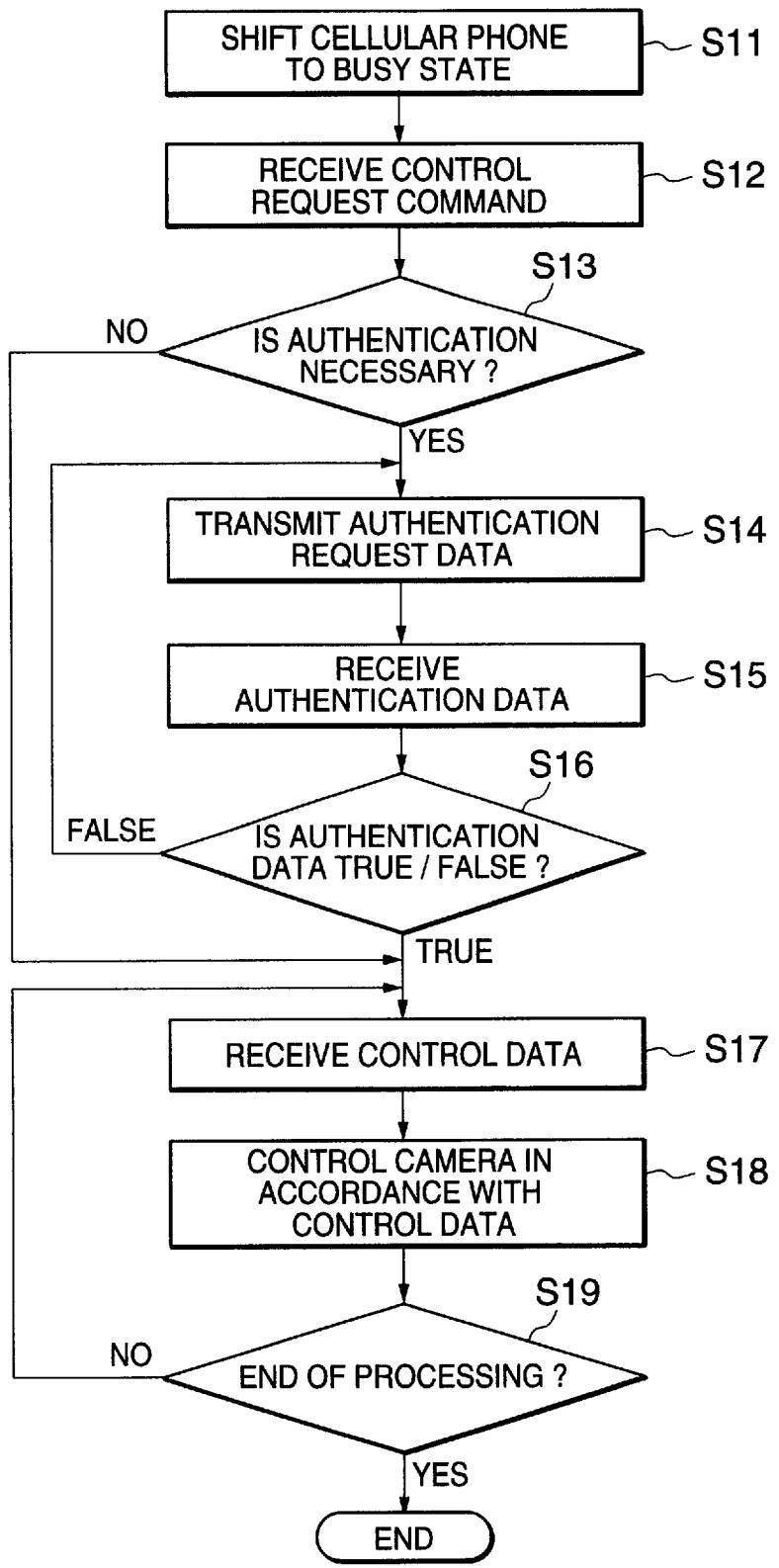

CELLULAR PHONE SET AND REMOTE CONTROL METHOD USED THEREFOR

BACKGROUND OF THE INVENTION

1. Field of the Invention

The present invention relates to a cellular phone set and a remote control method used therefor and, more particularly, to a remote control method for a videophone function used for surveillance.

2. Description of the Prior Art

According to a conventional videophone function of this type, some videophone apparatus includes the speech communication mode of allowing the user to perform speech communication and the surveillance mode of periodically sensing images by a camera and storing the sensed images in an image memory, thus allowing the videophone apparatus to have a surveillance function. This technique is disclosed in Japanese Unexamined Patent Publication No. 10-224754.

According to the technique disclosed in this reference, when an incoming call is received from a distant apparatus in the above surveillance mode, an image is transmitted after the distant apparatus is checked by a password. For this image transmission, the following modes are prepared: the mode of transmitting images while performing image sensing operation, and the mode of transmitting images after reading out the images from an image memory. One of these modes is set in advance, and the modes are switched in accordance with a control signal received through a telephone line.

In a mobile communication system, a method of transmitting a still image sensed by a CCD (Charge Coupled Device) camera or the like connected to a cellular phone set having an electronic mail function upon attaching the image to electronic mail has been put into practice.

Some of the above conventional videophone apparatuses are equipped with surveillance functions so as to be used as surveillance monitors. Since a camera itself or a device for transmitting images sensed by the camera are large in size, such a videophone apparatus cannot be downsized.

In addition, some cellular phone sets allow CCD cameras and the like for sensing still images to be connected. However, operators must perform manual operation to process and transmit images obtained from CCD cameras and the like. The transmission capability of the existing schemes are too low to make cellular phone sets have the videophone function of transferring a large volume of image data in real time.

SUMMARY OF THE INVENTION

The present invention has been made to solve the above problems, and has as its object to provide a cellular phone set which can be used as a remote surveillance monitor or a simple monitor for remote medical treatment, and a remote control method used for the cellular phone set.

It is another object of the present invention to provide a cellular phone set which can prevent improper control in performing various control operation on the connection destination, and a remote control method used for the cellular phone set.

In order to achieve the above objects, according to the first main aspect of the present invention, there is provided a cellular phone set comprising a videophone function of performing real-time image transfer by using a communication scheme with high transmission capability, and means for transmitting control data for controlling various functions including the videophone function on a distant side in response to a specific external operation during speech communication.

Another cellular phone set according to the present invention comprises, in addition to the above arrangement, means for sending an authentication request to the distant side when the control data is transmitted from the distant side, and means for permitting/inhibiting control on the videophone function and each of the functions in accordance with an authentication result on data sent in response to the authentication request.

According to the present invention, there is provided a remote control method for a cellular phone set, comprising the step of, in response to a specific external operation during speech communication, transmitting control data for controlling various functions on a distant side, including a videophone function of performing real-time image transfer by using a communication scheme with high transmission capability.

Another remote control method for a cellular phone set according to the present invention comprises, in addition to the above step, the step of sending an authentication request to the distant side when the control data is transmitted from the distant side, and the step of permitting/inhibiting control on the videophone function and each of the functions in accordance with an authentication result on data sent in response to the authentication request.

According to a characteristic feature of the cellular phone set of the present invention, the videophone function (including the function realized through an external adaptor) of performing real-time image transfer by using a next-generation communication scheme with high transmission capability such as W-CDMA (Wideband-Code Division Multiple Access) is realized, and control on a camera on the distant side can be performed by performing specific operation during speech communication.

According to another characteristic feature of the cellular phone set of the present invention, in using the digital camera function, music replay function, and the like (including the function realized through an external adaptor), various control operations are performed on the connection destination in applications other than applications for the videophone function, e.g., applications for the image sensing operation of a digital camera and settings of sound quality and the like in the music replay function.

In performing various control operations on the connection destination, the cellular phone set according to the present invention can permit/inhibit control by an authentication request based on a password from the side subjected to the various control operations.

In performing various control operations on the connection destination, the cellular phone set according to the present invention allows the user on the side subjected to the various control operations to select permission/inhibition by notifying the user of the contents of the control operations.

In addition, in performing various control operations on the connection destination, the cellular phone set according to the present invention performs permission/inhibition determination on each control operation by using the telephone number notification function in accordance with a telephone number sent from the request side.

More specifically, in the cellular phone set according to the present invention, the videophone function of performing real-time image transfer by using a next-generation communication scheme with high transmission capability such as W-CDMA is realized, and the user on the side from which a camera control request is sent to the connection destination transmits control information on the camera to the connection destination upon specific key operation or the like. Assume that key operation, control information, and camera operation corresponding to the control information are associated with each other in advance by users on the respective sides.

On the control information receiving side, the operation of the camera is controlled in accordance with control information in received data. The operation of the camera includes setting of a direction, magnification, resolution, ON/OFF operation of images, and the like. For example, in these control operations, authentication and number notification function based on passwords are used, as needed, to permit control only when communication is performed with a specific telephone number.

On the controlled side, upon reception of a control request, permission/inhibition of control can be selected. In selecting permission/inhibition, various levels (various types of operations for permission of control) can be set, as needed. When authentication using a password or the like is required, control data is transmitted to the connection destination to, for example, display a message that prompts the user to input a password or the like. In addition, when permission/inhibition of control can be selected, control data informing the corresponding information is transmitted.

As obvious from the above aspects and the description thereof, according to the cellular phone set of the present invention, control data for controlling various functions on the distant side, including the videophone function of performing real-time image transfer by using a communication scheme with high transmission capability is transmitted in response to specific external operation during speech communication. This makes it possible to use the cellular phone set as a remote surveillance monitor and simple monitor for remote medical treatment as well as a phone having the videophone function for performing general communication.

In addition, according to the cellular phone set of the present invention, an authentication request is sent to the distant side upon reception of control data from the distant side, and permits/inhibits control on each function in accordance with the data authentication result sent in response to the authentication request, thereby preventing improper control in performing various control operations on the connection destination.

Furthermore, various control operations on the connection destination can be performed in applications other than applications for the videophone function, e.g., applications for the image sensing operation of a digital camera or the like and settings of sound quality and the like in the music replay function.

The above and many other objects, features and advantages of the present invention will become manifest to those skilled in the art upon making reference to the following detailed description and accompanying drawings in which preferred embodiments incorporating the principle of the invention are shown by way of illustrative examples.

BRIEF DESCRIPTION OF THE DRAWINGS

FIG. 3 is a flow chart showing an example of the operation of the cellular phone set on the control request receiving side according to the embodiment of the present invention.

DETAILED DESCRIPTION OF PREFERRED EMBODIMENT

Figure 1:
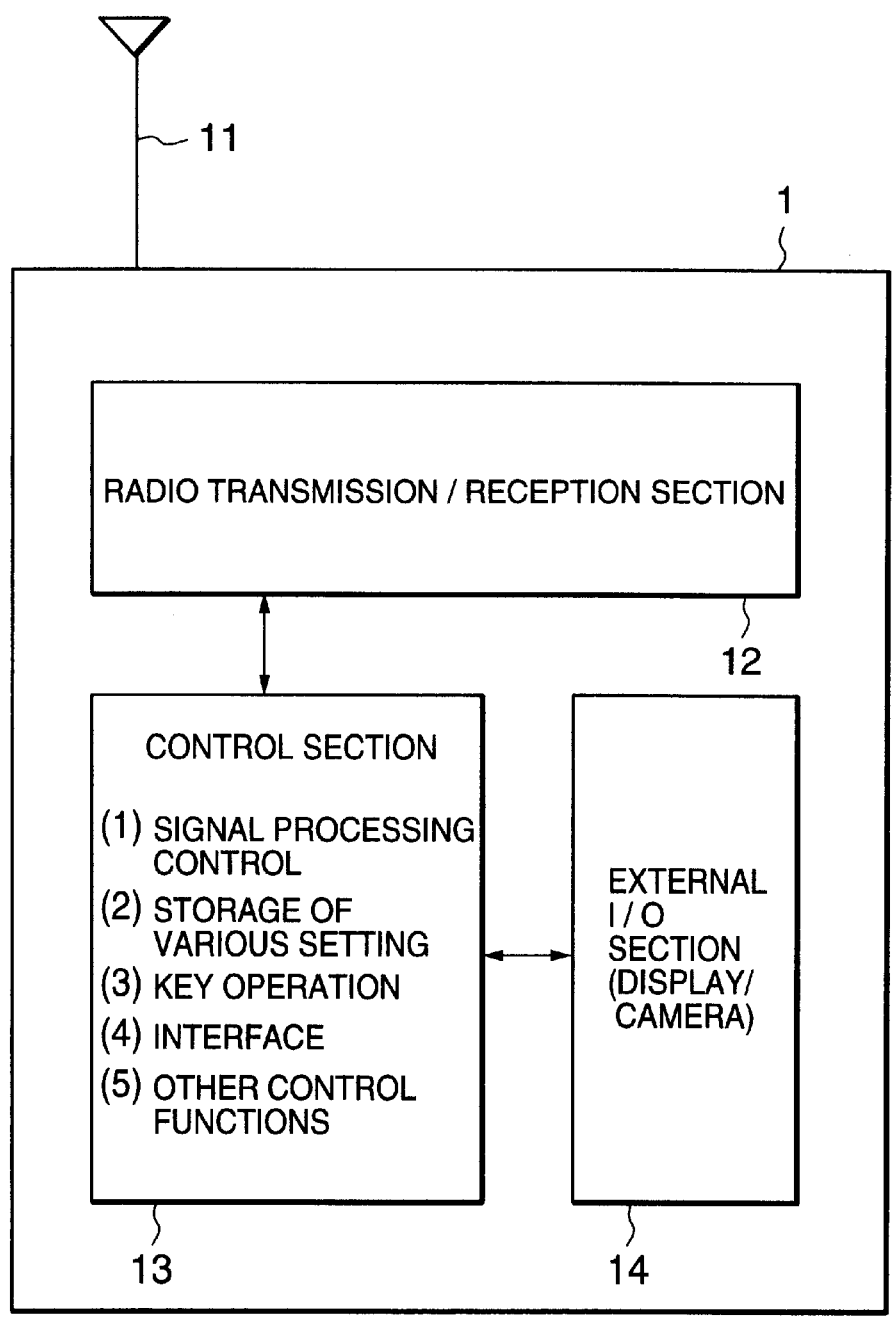
FIG. 1 is a block diagram showing the arrangement of a cellular phone set according to an embodiment of the present invention.

A preferred embodiment of the present invention will be described below with reference to the accompanying drawings. FIG. 1 is a block diagram showing the arrangement of a cellular phone set according to an embodiment of the present invention. Referring to FIG. 1, a cellular phone set 1 is comprised of an antenna 11 for transmitting/receiving radio signals, a radio transmission/reception section 12 for transmitting/receiving signals to/from the antenna 11, a control section 13 for performing overall control, e.g., control on processing for signals from the radio transmission/reception section 12, control on the function of storing key operation and various settings, and an external I/O (input/output) section 14 having a display and camera (not shown). The cellular phone set 1 has the videophone function of transferring images in real time by using a next-generation communication scheme with high transmission capability such as W-CDMA.

With the videophone function, since sensed images are large in volume, it is impossible to transfer the images in real time with the transmission capability of the cellular phone set. In contrast to this, according to a next-generation communication scheme such as W-CDMA, since the bandwidth is larger than 1.25 MHz, a faster data communication service can be provided. This makes it possible to transfer the images in real time. For such a technique, various schemes have been proposed. All these schemes are known by ITU-R (International Telecommunication Union-Radiocommunication Sector) recommendations and the like, and are not directly relevant to the present invention. Hence, a description of these schemes will be omitted.

On the side that generates camera control requests to a connection destination, control commands generated by the control section 13 upon various key operations and the like are transferred to the radio transmission/reception section 12 and are transmitted them from the antenna 11.

On the side where the camera is controlled, the control commands received through the antenna 11 and radio transmission/reception section 12 are analyzed by the control section 13, and operations corresponding to the commands are performed. The external I/O section 14 controls the operation of the camera in accordance with the control data sent from the control section 13.

Figure 2:
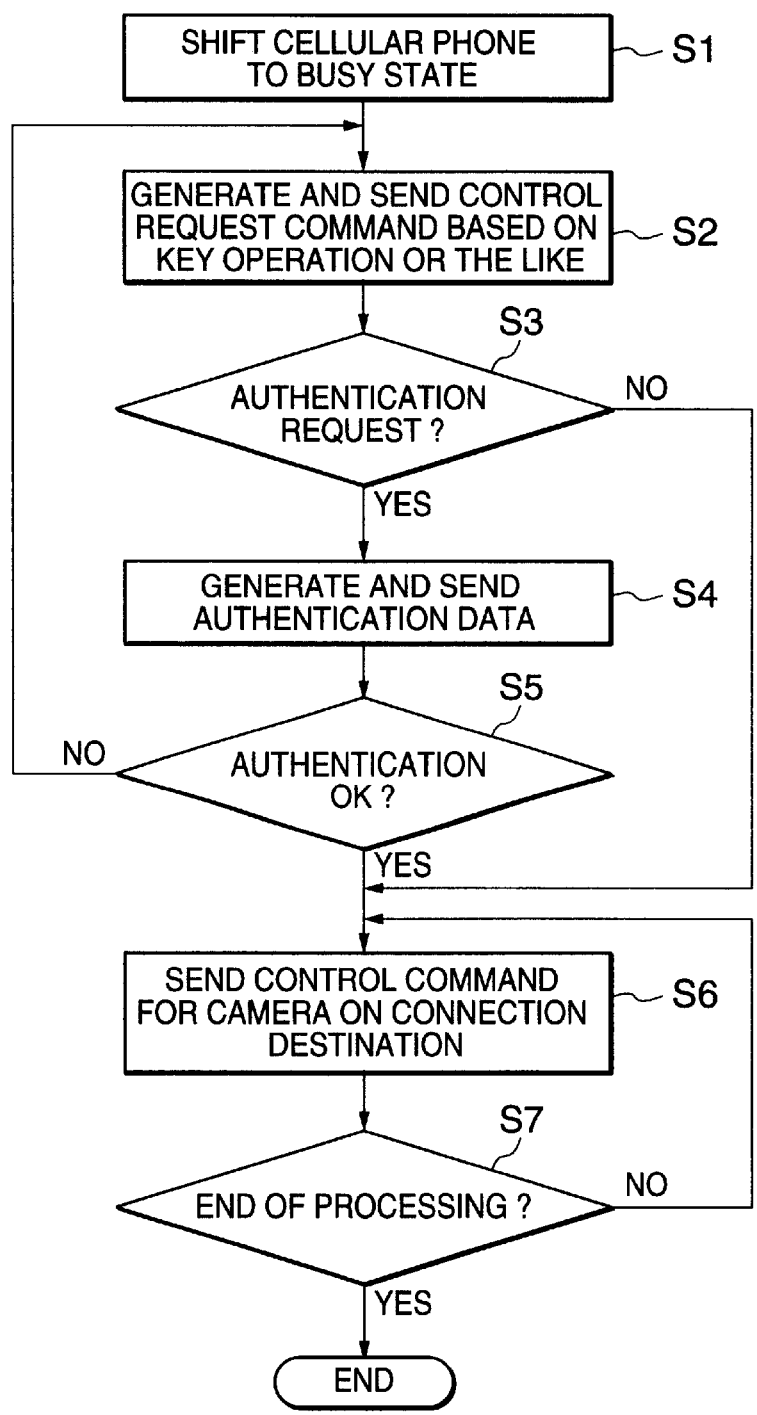
FIG. 2 is a flow chart showing an example of the operation of the cellular phone set on the control request transmitting side according to the embodiment of the present invention.

FIG. 2 is a flow chart showing the operation of the cellular phone set 1 on the control request transmitting side according to an embodiment of the present invention. An example of the operation of the cellular phone set 1 on the control request transmitting side according to the embodiment of the present invention will be described with reference to FIGS. 1 and 2.

When communication is started, the cellular phone set 1 shifts to a busy state (step S1 in FIG. 2), and transmits a control request command generated by key operation or the like (step S2 in FIG. 2). If an authentication request is received from a connection destination (not shown) (step S3 in FIG. 2), the cellular phone set 1 transmits authentication data such as a password (step S4 in FIG. 2). If no authentication request is received (step S3 in FIG. 2), data for controlling the destination camera (not shown) is generated by key operation or the like and transmitted (step S6 in FIG. 2).

Upon reception of an authentication request, the cellular phone set 1 determines the authentication result (step S5 in FIG. 2). If there is no problem, data for controlling the destination camera is transmitted (step S6 in FIG. 2). If the cellular phone set 1 determines that the authentication data is false, the flow advances to step S2. The cellular phone set 1 keeps transmitting data for controlling the destination camera until the processing is completed (step S7 in FIG. 2).

FIG. 3 is a flow chart showing the operation of the cellular phone set 1 on the control request receiving side according to the embodiment of the present invention. An example of the operation of the cellular phone set 1 on the control request receiving side according to the embodiment of the present invention will be described with reference to FIGS. 1 and 3.

When communication is started, the cellular phone set 1 shifts to a busy state (step S11 in FIG. 3). Upon reception of a control request command (step S12 in FIG. 3), the cellular phone set 1 detects on the basis of the settings in itself whether authentication is necessary or not (step S13 in FIG. 3). If authentication is not necessary, the cellular phone set 1 receives control data (step S17 in FIG. 3).

If authentication is necessary, the cellular phone set 1 transmits data that informs an authentication request (step S14 in FIG. 3), and receives authentication data from the connection destination (step S15 in FIG. 3).

The cellular phone set 1 makes true/false determination on the received authentication data (step S16 in FIG. 3). If the authentication data is true, the cellular phone set 1 receives the control data (step S17 in FIG. 3), and controls the camera in accordance with the control data sent from the connection destination (step S18 in FIG. 3). The reception of control data and control on the camera are repeatedly performed until the processing is terminated (step S19 in FIG. 3).

If the authentication data is false, the cellular phone set 1 sends out data that informs an authentication request again (step S14 in FIG. 3), and receives authentication data from the connection destination (step S15 in FIG. 3).

In each step on the above control request transmitting side and control request receiving side, users are notified of information, as needed, through means such as displays (not shown) on the basis of control data.

In this manner, speech communication is performed between the cellular phone sets 1 each having the videophone function of transferring images in real time by using a next-generation communication scheme with high transmission capability such as W-CDMA, and the user on the side from which a camera control request is sent to the connection destination transmits control information on the camera to the connection destination upon specific key operation or the like. Assume that key operation, control information, and camera operation corresponding to the control information are associated with each other in advance by users on the respective sides.

On the control information receiving side, the operation of the camera is controlled in accordance with control information in received data. The operation of the camera includes setting of a direction, magnification, resolution, ON/OFF operation of images, and the like. For example, in these control operations, authentication and number notification function based on passwords are used, as needed, to permit control only when communication is performed with a specific telephone number.

On the controlled side, upon reception of a control request, permission/inhibition of control can be selected. In selecting permission/inhibition, various levels (various types of operations for permission of control) can be set, as needed.

When authentication using a password or the like is required, control data is transmitted to the connection destination to, for example, display a message that prompts the user to input a password or the like. In addition, when permission/inhibition of control can be selected, control data informing the corresponding information is transmitted.

As described above, each cellular phone set having a videophone function is allowed to control a camera at the connection destination. If, therefore, one of the cellular phone sets is set in the automatic termination mode, it can be used as a remote surveillance monitor or simple monitor for remote medical treatment. In addition, improper control can be prevented by sending an authentication request to the control side.

In cellular phone sets (not shown) having digital camera functions (not shown), music replay functions, and the like (including cellular phone sets designed to realize these functions through external adaptors), various control operations at connection destinations in applications other than applications for the videophone function, e.g., applications for the image sensing operation of digital cameras and settings of sound quality and the like in the music replay function can be performed in the same manner as described above.

What is claimed is:

1. A cellular phone set comprising:

a videophone function of performing real-time image transfer by using a ommunication scheme with high transmission capability, and means for transmitting control data for controlling various functions ncluding the videophone function on a distant side in response to a specific external operation during speech communication, means for sending an authentication request to the distant side when the control data is transmitted from the distant side, and means for permitting/inhibiting control on each of the functions in accordance with an authentication result on the data sent in response to the authentication request.

2. A remote control method for a cellular phone set, comprising the step steps of:

in response to a specific external operation during speech communication, transmitting control data for controlling various functions on a distant side, including a videophone function of performing real-time image transfer by using a communication scheme with high transmission capability, receiving control data transmitted from the distant side for controlling the cellular phone set, sending an authentication request to the distant side after having received the control data transmitted from the distant side, and permitting/inhibiting control on each of the functions in accordance with an authentication result on data sent from the distant side in response to the authentication request.

* * * * *